United States Patent Office 3,291,761
Patented Dec. 13, 1966

3,291,761
RECLAIMING PROCESS FOR FLUOROCARBON ELASTOMERS CROSS-LINKED THROUGH AN AMINE BRIDGE
Warren R. Griffin, 2517 Olson Drive, Dayton, Ohio
No Drawing. Filed Oct. 1, 1963, Ser. No. 313,130
4 Claims. (Cl. 260—2.3)

The invention described herein may be manufactured and used by or for the United States Government for governmental purposes without payment to me of any royalty thereon.

This invention relates to a process for reclaiming vulcanizates of fluorinated hydrocarbon elastomeric polymers. More specifically, this invention concerns itself with the devulcanization or destruction of a stable three dimensional network of polymer chains and the regeneration of the polymer to a viscous thermoplastic gum.

Fluorinated hydrocarbon elastomeric polymers, particularly halogenated alkyl-vinylidene fluoride copolymers, are extraordinarily long molecules having a rubber-like elasticity in which a portion of the carbon-bonded hydrogen is replaced by the element fluorine. The vulcanization of these polymers produces a composition which is especially suitable for use as seals and gaskets for oil, fuel and hydraulic systems because of its outstanding resistance to chemical deterioration at elevated temperatures. The high degree of thermal stability, resistance to oxidative degradation, and resistance to the swelling action of fuels, lubricants and hydraulic fluids at temperatures in the range of 500 to 600° F. make these vulcanizates especially valuable for high temperature sealing applications in high speed aircraft and missiles. The unvulcanized fluorocarbon elastomers possess the usual physical properties of natural and synthetic rubbers, such as, selected solvent solubility, thermoplasticity, and processability on conventional rubber processing equipment. With vulcanization, however, the fluorocarbon elastomers possess those properties enumerated above which have been found so useful in high temperature sealing applications. To achieve proper vulcanization, the polymer chain must be cross-linked into a stable three dimensional network. It has been found that this can best be accomplished by employing polyfunctional hydrocarbon amines as the cross-linking agent. Apparently, the amine forms a bridge between the polymer chains thereby establishing a stable three dimensional network.

The widespread use of the fluorocarbon elastomeric vulcanizates referred to above, although very desirable because of their unique engineering properties, present certain economic problems because of their great expense. Approximately 10 to 20 percent of the vulcanized fluorocarbon elastomeric material used in making various components results in useless scrap produced during the molding process. Excess material, trimmings from the final product and the scrap material have little or no value and are usually disposed of. This rejected material, which is of no market value, becomes a cost burden on the final molded product. Consequently, the cost of the final product, which includes the cost of the rejected material, must be sufficiently high to overcome the economic loss resulting from the scrap material.

Accordingly, it is the primary object of this invention to circumvent the above described problem by providing a novel method for reclaiming amine-vulcanized fluorocarbon elastomeric scrap material.

Another object of this invention is to provide a novel method for treating a cross-linked fluorocarbon elastomeric polymer having an amine bridge in such a manner as to chemically remove said bridge without destroying the polymer chain.

Still another object of this invention is to provide a method for treating amine-vulcanized fluorocarbon elastomers in order that said elastomers can be more economically utilized in high temperature sealing applications.

Still a further object of this invention is to provide a method which renders fluorocarbon scrap material as useful as the original processable material by a simple, novel and economic reclaiming process.

The above and still further objects, advantages and features of this invention will become readily apparent upon consideration of the following detailed description of a specific embodiment thereof.

It has been found in accordance with this invention that the aforestated objects can be accomplished by treating the vulcanized elastomers with acid permanganate, particularly potassium permanganate-acetic acid mixtures.

The following examples, in which parts given are by weight, present a detailed illustration of the principles involved in this invention. Example 1 discloses a known method for producing the vulcanized fluorocarbon elastomers which are subjected to the reclaiming process described herein. Example 2 discloses a specific embodiment of the reclaiming process of this invention. Other suitable fluorocarbon vulcanizates and hydrocarbon cross-linking agents such as those described in Patent No. 3,041,316, may be employed in the reclaiming process of this invention.

EXAMPLE 1

| Ingredients: | Parts |
|---|---|
| Viton A [1] | 100 |
| Medium thermal carbon black | 25 |
| Magnesium oxide | 20 |
| Hexamethylene diamine carbamate | 1.3 |

[1] Viton A is a hexafluoropropylene-vinylidene fluoride copolymer having a molecular weight of about 60,000 and a monomer weight ratio of about 70% vinylidene fluoride and 30% hexafluoropropylene. It is disclosed and more fully described in a pamphlet entitled "Properties of a New Fluorine-Containing Elastomer," Contribution No. 111, Elastomers Laboratory, Organic Chemicals Department, E. I. du Pont de Nemours and Company, Inc.

The above ingredients are interdispersed on a conventional rubber mill and form a soft thermoplastic mass which is easily shaped into a predetermined form by pressure molding. During the molding process of approximately 30 minutes at a temperature of about 320° F., the major amount of cross-linking occurs such that the mass will no longer process as a soft thermoplastic viscous material.

The fluorocarbon polymers are very resistant to oxidation. Only under drastic conditions, such as, basic permanganate oxidation are the polymer chains attacked. On the other hand, hydrocarbon chains are easily oxidized by neutral permanganate. Since the cross-linking action of the elastomeric polymer typified by Example 1 is of a hydrocarbon nature, it can be easily cleaved by oxidation with neutral or acid permanganate. With this type of cleavage, the fluorocarbon polymer chains suffer little or no damage and the polymer chains are released from their stable three dimensional network and returned to their original, prevulcanized state of a viscous gum.

EXAMPLE 2

Twenty grams of scrap material obtained from the molding process described in Example 1 were placed in a 400 ml. beaker with 200 ml. of acetone, 20 ml. of glacial acetic acid, and one gram of potassium permanganate. After slowly stirring for four hours, the black solution was smooth without evidence of the original lump of scrap material which had been added. Approximately 20 ml. of concentrated sodium bisulphite was added to destroy the insoluble maganese dioxide resulting from the reduction of the permanganate. Water from the bisulphite solution also serves to precipitate the polymer from the acetone solution. The precipitated crumbs of reclaimed polymer were washed with water and vacuum dried. Since the carbon black and polymer are stable to oxidation, only 15 to 20 parts magnesium oxide and 1.3 parts of hexamethylenediamine carbamate need be added to make a complete molding compound. This compound was observed to band and mill smoothly, not unlike that of the original virgin material. The mass was then press molded in a manner similar to that of Example 1. The properties of the vulcanized material made from the reclaimed polymer were compared with those of virgin stock from which the scrap material was obtained after press molded sheets of each material were given a 24 hour oven treatment at 400° F. to complete the vulcanization. The results of the foregoing comparison are set forth in Table 1.

*Table I*

|  | Virgin | Reclaimed |
|---|---|---|
| Tensile Strength, p.s.i. | 2,360 | 1,950 |
| Elongation, percent | 220 | 200 |
| Hardness, Shore A | 71 | 72 |
| Compression Set, 24 hrs. at 400° F., 25% Compression | 48 | 40 |
| After air aging 16 hours at 600° F.: |  |  |
| Tensile Strength, p.s.i. | 1,430 | 1,300 |
| Elongation, percent | 120 | 135 |

As can be readily seen from the close agreement of the above properties, virgin and reclaimed material can be mixed in any proportion without altering the mechanical properties of the final product. One must only consider that the reclaimed material contains carbon black as well as polymer.

A solvent, other than acetone, may be employed in Example 2, provided it is stable to permanganate oxidation. However, acetone is preferred because of its stability. Any mineral acid, stable to permanganate oxidation, may be utilized, such as, hydrochloric or sulfuric acid. However, glacial acetic acid is preferred because it also acts as a solvent for the unvulcanized polymer, as well as rendering the solution acid with a pH value less than 7.

From a consideration of the foregoing, it can be seen that the present invention provides a novel and economical process for reclaiming scrap fluorocarbon vulcanizates. By use of the process in accordance with the invention the cost of such items as O-ring seals, hose, gaskets, and other components which are made from fluorocarbon vulcanizates is significantly reduced because expensive scrap material no longer constitutes a portion of the raw material cost.

While specific embodiments of the invention have been described with particularity, it will be evident to those skilled in the art that the invention is not limited thereto; but that various modifications may be made without departing from the spirit of the invention as defined by the scope of the appended claims.

Having thus described my invention, what I claim and desire to protect by Letters Patent is:

1. A process for reclaiming amine-vulcanized fluorocarbon elastomeric scrap material cross-linked through an amine bridge, said process consisting essentially of the steps of adding a permanganate to a mixture consisting essentially of a solvent, an acid and said scrap material, said mixture having a resultant pH value less than 7; and stirring said mixture for approximately four hours to effectuate oxidative cleavage of said amine bridge thereby returning said vulcanized scrap material to its pre-vulcanized state.

2. A process in accordance with claim 1 wherein said permanganate is potassium permanganate.

3. A process in accordance with claim 1 wherein said solvent is acetone.

4. A process in accordance with claim 1 wherein said acid is glacial acetic.

References Cited by the Examiner

FOREIGN PATENTS 936,828   9/1963   Great Britain.

MURRAY TILLMAN, *Primary Examiner.*

D. J. BREZNER, *Assistant Examiner.*